United States Patent
Sauer et al.

(10) Patent No.: US 9,629,376 B2
(45) Date of Patent: *Apr. 25, 2017

(54) MICROBIOCIDAL TREATMENT OF EDIBLE FRUITS AND VEGETABLES

(71) Applicant: Albemarle Corporation, Baton Rouge, LA (US)

(72) Inventors: Joe D. Sauer, Baton Rouge, LA (US); George W. Cook, Jr., Baton Rouge, LA (US); William S. Pickrell, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 285 days.

This patent is subject to a terminal disclaimer.

(21) Appl. No.: 13/739,087

(22) Filed: Jan. 11, 2013

(65) Prior Publication Data

US 2013/0129843 A1 May 23, 2013

Related U.S. Application Data

(63) Continuation-in-part of application No. 12/517,646, filed as application No. PCT/US2008/050901 on Jan. 11, 2008, now abandoned.

(60) Provisional application No. 60/884,633, filed on Jan. 12, 2007.

(51) Int. Cl.
| | | |
|---|---|---|
| A01N 59/00 | (2006.01) |
| A61K 33/00 | (2006.01) |
| A23B 7/154 | (2006.01) |
| A23B 7/157 | (2006.01) |

(52) U.S. Cl.
CPC .............. *A23B 7/154* (2013.01); *A23B 7/157* (2013.01)

(58) Field of Classification Search
USPC ........................................................ 424/723
See application file for complete search history.

(56) References Cited

U.S. PATENT DOCUMENTS

| | | |
|---|---|---|
| 2,386,954 A | 10/1945 | Kalmar |
| 2,766,124 A | 10/1956 | Upham |
| 3,147,259 A | 9/1964 | Paterson |
| 4,001,443 A | 1/1977 | Dave |
| 4,081,474 A | 3/1978 | Baker et al. |
| 4,382,799 A | 5/1983 | Davis et al. |
| 4,681,948 A | 7/1987 | Worley et al. |
| 4,740,524 A | 4/1988 | Hsu |
| 4,767,542 A | 8/1988 | Worley |
| 4,822,816 A | 4/1989 | Markham |
| 4,968,716 A | 11/1990 | Markham |
| 4,978,685 A | 12/1990 | Gannon et al. |
| 5,057,612 A | 10/1991 | Worley et al. |
| 5,070,085 A | 12/1991 | Markham |
| 5,679,239 A | 10/1997 | Blum et al. |
| 5,948,315 A | 9/1999 | Yang et al. |
| 6,007,726 A | 12/1999 | Yang et al. |
| 6,068,861 A | 5/2000 | Moore, Jr. et al. |
| 6,123,870 A | 9/2000 | Yang et al. |
| 6,156,229 A | 12/2000 | Yang et al. |
| 6,270,722 B1 | 8/2001 | Yang et al. |
| 6,508,954 B1 | 1/2003 | Elnagar et al. |
| 6,534,075 B1 | 3/2003 | Hei et al. |
| 6,660,310 B2 | 12/2003 | Carlson |
| 6,809,205 B1 | 10/2004 | Elnagar et al. |
| 6,908,636 B2 | 6/2005 | Howarth |
| 2001/0014364 A1 | 8/2001 | Myers et al. |
| 2002/0012725 A1 | 1/2002 | Carlson |
| 2003/0113402 A1 | 6/2003 | Howarth et al. |
| 2004/0022874 A1* | 2/2004 | Nalepa et al. ................ 424/723 |
| 2004/0265445 A1* | 12/2004 | Liimatta ........................ 426/332 |
| 2004/0265446 A1* | 12/2004 | McNaughton ................ 426/332 |
| 2005/0151117 A1* | 7/2005 | Man et al. ................. 252/186.1 |
| 2010/0196566 A1 | 8/2010 | Sauer et al. |

FOREIGN PATENT DOCUMENTS

| | | |
|---|---|---|
| AU | 611155 B2 | 6/1991 |
| AU | 772067 B2 | 4/2004 |
| EP | 1113112 A1 | 7/2001 |
| EP | 1113112 A4 | 9/2005 |
| EP | 1113112 B1 | 2/2011 |

(Continued)

OTHER PUBLICATIONS

Lamikanra (Fresh-cut fruits and vegetables: science, technology, and market, Chapter 9; CRC Press, Feb. 14, 2002).*
Busan (https://www3.epa.gov/pesticides/chem_search/ppls/001448-00345-20030321.pdf; Mar. 21, 2003).*
Hach Company, "Hach Water Analysis Handbook"; 3rd Edition, 1997; Loveland, Co; pp. 1206-1207 (4 pages).

(Continued)

*Primary Examiner* — Devang Thakor
(74) *Attorney, Agent, or Firm* — Marcy M. Hoefling

(57) ABSTRACT

Methods of controlling bacterial, yeast, and/or mold contamination of edible fruits or vegetables comprise applying thereto an aqueous microbiocidal composition formed from water and (A) at least one component selected from (I) a solid-state microbiocidal compound having at least one bromine atom per molecule; (II) an aqueous solution/slurry of a compound of (I); (III) a concentrated aqueous composition having an active bromine content of at least 50,000 ppm derived from water and (i) BrCl or BrCl and Br$_2$ and (ii) overbased alkali metal sulfamate, where the relative proportions of (i) and (ii) give an atom ratio of nitrogen to active bromine greater than 0.93, and where the pH of the composition is greater than 7; and (IV) a solid-state composition formed by dewatering a composition of (III).

8 Claims, No Drawings

(56) References Cited

FOREIGN PATENT DOCUMENTS

| GB | 1012629 A | 12/1965 |
|---|---|---|
| JP | 11286453 | 10/1999 |
| JP | 2003250436 | 9/2003 |
| WO | 03001931 A1 | 1/2003 |
| WO | 03073849 A1 | 9/2003 |
| WO | 2004073408 A1 | 9/2004 |
| WO | 2005068378 A1 | 7/2005 |
| WO | 2006043948 A1 | 4/2006 |

OTHER PUBLICATIONS

Willard, Hobart H., et al. "Elementary Quantitative Analysis Theory and Practice", Third Edition, Chapter XIV, New York, D. Van Nostrand Company, Inc., 1935, pp. 261-271; (13 pages).
Author Unknown; "DBDMH"; Wikipedia Article; Website: http://en.wikipedia.org/wiki/DBDMH; (Visited May 21, 2012); 2 pages.
Author Unknown; "Material Safety Data Sheet"; Website: http://fscimage.fishersci.com/msds/54619.htm; (Visited May 21, 2012); 6 pages.
Author Unknown; "Choosing Healthy Fats"; Website: http://www.helpguide.org/life/healthy_diet_fats.htm; (Visited May 16, 2012); 2 pages.
H., Laura; "Fat Content of Fruits & Vegetables" ; Website: http://www.livestrong.com/article/409529-fat-content-of-fruits-vegetables/; Mar. 28, 2011; (Visited May 18, 2012); 2 pages.
Lamikanra; "Preservative Treatments for Fresh-Cut Fruits and Vegetables"; Science, Technology and Market; Chapter 9; CRC Press, Feb. 14, 2002; pp. 275-278.
Mountney, et al.; Poultry Products Technology; Third Edition; 1995; p. 68; Table 4.1; (Comparison of Composition of Cooked Meats).
Murphy, Pam; "What Fruit and Vegetables Contain Protein?"; Website: http://www.livestrong.com/article/277947-what-fruit-and-vegetables-contain-protein/; Jun. 14, 2011; (Visited May 18, 2012); 2 pages.
Murphy, Pam; "Calories & Fat Grams in Fruit & Vegetables" Website: http://www.livestrong.com/article/270519-calories-fat-grams-in-fruit-vegetables/; Oct. 5, 2010; (Visited May 18, 2012) 2 pages.
Mitcham et al., "Apple, Gala: Recommendations for Maintaining Postharvest Quality"; University of California, Davis, http://postharvest.ucdavis.edu/PFfruits/AppleGala/, Aug. 22, 2013; 2 pages.
Agricultural Research Service, United States Department of Agriculture, "Basic Report: 05001, Chicken, broilers or fryers, meat and skin and giblets and neck, raw"; http://ndb.nal.usda.gov/ndb/foods/show/794?fg=Poultry+Products&man=&lfacet=&format=&count=&max=25&offset=&sort=&qlookup=; Website Visited Jan. 24, 2014; 2 pages.
Agricultural Research Service, United States Department of Agriculture, "Basic Report: 05011, Chicken, broilers or fryers, meat only, raw"; http://ndb.nal.usda.gov/ndb/foods/show/804?fg=Poultry+Products&man=&lfacet=&format=&count=&max=25&offset=&sort=&qlookup=; Website Visited Jan. 24, 2014; 2 pages.
Agricultural Research Service, United States Department of Agriculture, "Basic Report: 09003, Apples, raw, with skin"; http://ndb.nal.usda.gov/ndb/foods/show/2200?fg=Fruits+and+Fruit+Juices&man=&lfacet=&format=&count=&max=25&offset=&sort=&qlookup=; Website Visited Jan. 24, 2014; 2 pages.
Agricultural Research Service, United States Department of Agriculture, Basic Report: 11011, Asparagus, raw, http://ndb.nal.usda.gov/ndb/foods/show/2873?fg=Vegetables+and+Vegetable+Products&man=&lfacet=&format=&count=&max=25&offset=&sort=&qlookup=; Website Visited Jan. 24, 2014; 2 pages.
Author Unknown; "Material Safety Data Sheet"; Acros Organics; Sep. 4, 2013; 9 pages.
Author Unknown; ChemIDplus page of the U.S. National Library of Medicine website; http://chem.sis.nlm.nih.gov/chemidplus/ProxyServlet?objectHandle . . . ; visited Aug. 16, 2013; 2 pages.
Cotton et al.; Advanced Inorganic Chemistry, 5th Edition, John Wiley & Sons, New York (1988), p. 544.

\* cited by examiner

1

MICROBIOCIDAL TREATMENT OF EDIBLE FRUITS AND VEGETABLES

REFERENCE TO RELATED APPLICATIONS

This is a continuation-in-part of commonly-owned copending application Ser. No. 12/517,646, filed Jun. 4, 2009, which in turn is the National Stage of International Patent Application PCT/US2008/050901, filed on Jan. 11, 2008, which application claims priority from U.S. Application No. 60/884,633, filed Jan. 12, 2007, the disclosures of which are incorporated herein by reference.

TECHNICAL FIELD

This invention relates to use of effective antimicrobial solutions for controlling contamination of edible fruits and vegetables by various pathogens such as species of *Listeria, Escherichia, Salmonella, Campylobacter*, and others. As used herein, the term "edible fruit and vegetable", whether used in the singular or plural, denotes any harvested or unharvested edible uncooked fruit or vegetable that is grown for consumption by humans.

BACKGROUND

Potential contamination of edible fruits and vegetables is a problem that has existed for many years. Prevention of contamination of edible fruits and vegetables by pathogenic microorganisms is important to protect public health. The reduction of spoilage caused by microorganisms in vegetable or fruit producing areas (e.g., farms, orchards, etc.), in food processing facilities (e.g., canning or frozen food facilities), in food drying facilities, or in wholesale or retail fruit or vegetable distribution centers and markets can extend product shelf lives and reduce the amount of food that is discarded as waste.

Despite prior efforts, there exists a need for improved methods of controlling microorganisms in facilities producing, processing, distributing or marketing edible fruits and vegetables. Bacteria, yeast and molds can accumulate at a variety of different points in such operations. The more such points at which viable microorganisms can be controlled, the lower are the chances of food contamination and the safer the food consumed by the purchaser.

U.S. Pat. No. 6,660,310 describes a method of infusing edible fresh or freshly cut fruit or vegetable. The fruit or vegetable is allowed to reach a state of relative metabolic stasis or inactivity. An infusion comprising an agent to be infused is provided and the fruit or vegetable is submerged therein or coated therewith. Among the agents referred to are an aroma enhancing agent, a flavor enhancing agent, a sweetening agent, a color-enhancing agent, a nutritionally beneficial agent, a phytochemical, a pharmaceutical agent, etc. The infusion is pressurized to a positive or negative pressure for a period of time. The patent indicates that preferably, the surface of the fruit or vegetable is disinfected with a bleach solution and/or an antimicrobial soap solution and that more preferably, the solution has a concentration in the range of about 0.01% to about 10%, and most preferably, the solution has a concentration of about 2%. A listing of materials used in experimental approaches indicates that either Clorox® Bleach (distributed by The Clorox Company of Oakland Calif.) in a 2% solution, or Safesoap® antimicrobial liquid hand soap (distributed by Colgate-Palmolive Company of New York, N.Y.) in a 2% solution were used.

It would be advantageous if a simpler way could be found for treating fruits and vegetables against microbiocidal contamination, especially if smaller amounts of a microbiocidal agent could be effectively utilized.

BRIEF SUMMARY OF THE INVENTION

This invention provides a new way of controlling bacterial, yeast, and/or mold contamination of edible fruits and vegetables at any of a variety of points in the production, processing, distribution or marketing of edible fruits and vegetables. The method involves a simple application of a highly effective stabilized microbiocide followed by a brief residence time of the microbiocide on the fruit or vegetable followed by a suitable washing procedure. In addition, the amount of the biocide used is less than that described in the above patent.

The aqueous microbiocidal composition is applied to the edible fruit or vegetable. Accordingly, this embodiment is a method of controlling bacterial, yeast, and/or mold contamination of at least one edible fruit or vegetable, which method comprises applying to the edible fruit or vegetable an aqueous microbiocidal composition containing less than 100 ppm (wt/wt) of active bromine formed from ingredients comprising water and at least one microbiocidal component selected from:

I) at least one solid-state microbiocidal compound having at least one bromine atom in the molecule;

II) an aqueous solution or slurry of at least one solid-state microbiocidal compound having at least one bromine atom in the molecule;

III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7; and IV) a solid-state microbiocidal composition which is a dewatered concentrated aqueous antimicrobial composition of III).

To form the microbiocidal compositions used in this embodiment, the selected microbiocidal component I), II), III), and/or IV) is mixed with the water.

In preferred embodiments, the applied aqueous microbiocidal composition is allowed to remain in contact with the edible fruit or vegetable for a microbiocidally-effective period, which typically is in the range of about 10 seconds to about 30 minutes, and preferably in the range of about 30 seconds to about 5 minutes, and then the edible fruit or vegetable is thoroughly washed at least once with water which, optionally, contains at least one surfactant. In this connection and as a general rule, the higher the concentration of bromine in the aqueous microbiocidal composition used, the shorter should be the time the microbiocidal composition is allowed to be in contact with the edible fruit or vegetable. The one or more washes that are utilized should be thorough enough to at least remove any and all detectable quantities of the antimicrobial composition from the treated edible fruit or vegetable. If a surfactant is used in one or more such washes, one or more subsequent water washes are to be employed to ensure removal of the surfactant from the edible fruit or vegetable.

The above and other embodiments and features of this invention will be still further apparent from the ensuing description and appended claims.

FURTHER DETAILED DESCRIPTION OF EMBODIMENTS OF THE INVENTION

As can be seen from the above, there are four general groups of bromine-based microbiocides used in the practice of this invention. These are more fully described below.

Group I) of Bromine-Based Microbiocides

Among the microbiocidal compositions utilized in the practice of this invention are solid-state microbiocidal compounds having at least one bromine atom in the molecule. Such compounds are exemplified by (a) 1,3-dihalo-5,5-dialkylhydantoins in which both of the halo atoms are bromine atoms and one of the alkyl groups is a methyl group and the other is a $C_{1-4}$ alkyl group and by (b) 1,3-dihalo-5,5-dialkylhydantoins in which one of the halo atoms is a bromine atom and the other is a chlorine atom, and both alkyl groups are, independently, $C_{1-4}$ alkyl groups. Because of their effectiveness and availability as articles of commerce, these solid-state microbiocidal compounds of (a) and (b) are more preferred than any other type of solid-state microbiocidal compound, and because of superior effectiveness, those of (a) are even more preferred, with 1,3-dibromo-5,5-dimethylhydantoin being most preferred of all.

Non-limiting examples of compounds of type (a) include 1,3-dibromo-5,5-dimethylhydantoin, 1,3-dibromo-5-ethyl-5-methylhydantoin, 1,3-dibromo-5-n-propyl-5-methylhydantoin, 1,3-dibromo-5-isopropyl-5-methylhydantoin, 1,3-dibromo-5-n-butyl-5-methylhydantoin, 1,3-dibromo-5-isobutyl-5-methylhydantoin, 1,3-dibromo-5-sec-butyl-5-methylhydantoin, 1,3-dibromo-5-tert-butyl-5-methylhydantoin, and mixtures of any two or more of them. Of these biocidal agents, 1,3-dibromo-5-isobutyl-5-methylhydantoin, 1,3-dibromo-5-n-propyl-5-methylhydantoin, and 1,3-dibromo-5-ethyl-5-methylhydantoin are, respectively, preferred, more preferred, and even more preferred members of this group from the cost effectiveness standpoint. Of the mixtures of the foregoing biocides that can be used pursuant to this invention, it is preferred to use 1,3-dibromo-5,5-dimethylhydantoin as one of the components, with a mixture of 1,3-dibromo-5,5-dimethylhydantoin and 1,3-dibromo-5-ethyl-5-methylhydantoin being particularly preferred. The most preferred member of this group of microbiocides is 1,3-dibromo-5,5-dimethylhydantoin. This compound is available in the marketplace in tablet or granular form under the trade designations XtraBrom® 111 biocide and XtraBrom® 111T biocide (Albemarle Corporation). When a mixture of two or more of the foregoing 1,3-dibromo-5,5-dialkylhydantoin biocides is used pursuant to this invention, the individual biocides of the mixture can be in any proportions relative to each other.

Non-limiting examples of compounds of type (b) include N,N'-bromochloro-5,5-dimethylhydantoin, N,N'-bromochloro-5-ethyl-5-methylhydantoin, N,N'-bromochloro-5-propyl-5-methylhydantoin, N,N'-bromochloro-5-isopropyl-5-methylhydantoin, N,N'-bromochloro-5-butyl-5-methylhydantoin, N,N'-bromochloro-5-isobutyl-5-methylhydantoin, N,N'-bromochloro-5-sec-butyl-5-methylhydantoin, N,N'-bromochloro-5-tert-butyl-5-methylhydantoin, N,N'-bromochloro-5,5-diethylhydantoin, and mixtures of any two or more of the foregoing. N,N'-bromochloro-5,5-dimethylhydantoin is available commercially under the trade designation Bromicide® biocide (Great Lakes Chemical Corporation). Another suitable bromochlorohydantoin mixture is composed predominantly of N,N'-bromochloro-5,5-dimethylhydantoin together with a minor proportion by weight of 1,3-dichloro-5-ethyl-5-methylhydantoin. A mixture of this latter type is available in the marketplace under the trade designation Dantobrom® biocide (Lonza Corporation). Of such products, N,N'-bromochloro-5,5-dimethylhydantoin is a preferred material because of its commercial availability and its suitability for use in the practice of this invention. The designation N,N' in reference to, say, N,N'-bromochloro-5,5-dimethylhydantoin means that this compound can be (1) 1-bromo-3-chloro-5,5-dimethylhydantoin, or (2) 1-chloro-3-bromo-5,5-dimethylhydantoin, or (3) a mixture of 1-bromo-3-chloro-5,5-dimethylhydantoin and 1-chloro-3-bromo-5,5-dimethylhydantoin. Also, it is conceivable that some 1,3-dichloro-5,5-dimethylhydantoin and 1,3-dibromo-5,5-dimethylhydantoin could be present in admixture with (1), (2), or (3).

Methods for preparing compounds of types (a) and (b) above are known and are reported in the literature. See for example U.S. Pat. Nos. 3,147,259; 6,508,954; and 6,809,205.

Other known solid-state microbiocidal compounds which may be utilized include N,N'-dihalo-2-imidazolidinones, such as 1,3-dibromo-4,4,5,5-tetramethyl-2-imidazolidinone, 1-bromo-3-chloro-4,4,5,5-tetramethyl-2-imidazolidinone, 1-chloro-3-bromo-4,4,5,5-tetramethyl-2-imidazolidinone, 1,3-dibromo-2,2,5,5-tetramethylimidazolidin-4-one, 1-bromo-3-chloro-2,2,5,5-tetramethylimidazolidin-4-one, 1-chloro-3-bromo-2,2,5,5-tetramethylimidazolidin-4-one. Preparation of such compounds is described in U.S. Pat. Nos. 4,681,948; 4,767,542; and 5,057,612.

Still other known solid-state microbiocidal compounds which may be utilized are sulfonyloxy bromoacetanilides such as m-isobutyl-sulfonyloxy bromoacetanilide and m-phenyl-sulfonyloxy bromoacetanilide. Still other examples and the preparation of such compounds are given in U.S. Pat. No. 4,081,474.

Another type of known solid-state microbiocidal compounds which may be utilized are bromine-containing alpha-halo pyruvate oximes such as described in U.S. Pat. No. 4,740,524. Examples of such compounds include ethyl 3-bromo-2-(4-chlorobenzoyloximino)propanoate, ethyl 3-bromo-2-(N'-methylcarbomoyloximino)propanoate, and ethyl 3-bromo-2-(4-methylbenzoyloximino)propanoate.

Yet another type of solid-state bromine-containing microbiocidal compounds which can be used are non-polymeric quaternary ammonium polybromides described in U.S. Pat. No. 4,978,685. Examples of such compounds include N-ethyl-N,N,N-trimethylammonium tribromide; N-ethyl-N-methylmorpholinium tribromide; N-benzyl-N,N-dimethyl-N-myristylammonium dibromochloride; N,N,N,N-tetrabutylammonium tribromide; and N,N,N,N-tetrabutylammonium dibromochloride.

Still other solid-state bromine-containing microbiocidal compounds are known and reported in the literature.

Group II) of Bromine-Based Microbiocides

Group II) constitutes another group of bromine-based microbiocidal compositions, one or more members of which can be utilized in the practice of this invention. These are aqueous solutions or slurries of at least one solid-state microbiocidal compound having at least one bromine atom in the molecule. One or more compounds referred to above in connection with Group I) can be used in forming these solutions or slurries. The solutions can contain any concentration of the respective compounds up to their saturation points. If higher concentrations are desired, slurries containing quantities in excess of the respective saturation points can be formed and used. Thus, for some non-limiting examples of Group II) compounds, see the examples given above in connection with Group I). The concentration of the solutions or slurries used are usually higher than the desired end use concentration in the washing solution applied to the fruit or vegetable.

Group III) of Bromine-Based Microbiocides

A number of bromine-based microbiocides are typically formed and provided in the form of concentrated aqueous solutions, and these concentrated aqueous solutions constitute Group III) of the bromine-based microbiocides used pursuant to this invention. Such microbiocides are typically stabilized against chemical decomposition and physical evaporation of active bromine species by the inclusion in the product during its formation of a suitable stabilizing component for the active bromine in the concentrated solution. A preferred liquid state bromine-based biocide of this type is an aqueous biocide composition comprising water having in solution therein an active bromine content derived from (i) bromine chloride or bromine chloride and bromine, with or without conjoint use of chlorine, of at least 50,000 ppm (wt/wt) and preferably at least 100,000 ppm (wt/wt), and (ii) overbased alkali metal salt of sulfamic acid (preferably a lithium, sodium, and/or potassium salt of sulfamic acid) and/or sulfamic acid, alkali metal base (preferably an oxide or hydroxide of lithium, sodium, and/or potassium) and water, wherein the relative proportions of (i) and (ii) are such that the atom ratio of nitrogen to active bromine is greater than 0.93, and wherein the pH of the composition is greater than 7, e.g., in the range of about 12 to 14. Concentrated solutions of this type are available in the marketplace, for example, Stabrom® 909 biocide (Albemarle Corporation). One suitable process for producing these concentrated aqueous microbiocidal solutions is described in commonly-owned U.S. Pat. No. 6,068,861, issued May 30, 2000, all disclosure of which is incorporated herein by reference. Another commercial concentrated aqueous microbiocidal solution that can be utilized in practicing this invention is available under the trade designation Stabrex™ biocide (Nalco Chemical Company). This product also contains active bromine stabilized against chemical decomposition and physical evaporation of active bromine species by the inclusion of sulfamate. For additional details concerning preparation of aqueous microbiocidal solutions stabilized with sulfamic acid, see U.S. Pat. Nos. 6,007,726; 6,156,229; and 6,270,722.

Group IV) of Bromine-Based Microbiocides

This group of bromine-based microbiocides is composed of solid-state microbiocidal compositions formed by dewatering (i.e., removing at least all of the liquid water from) a sulfamate-stabilized aqueous concentrate of active bromine of Group III) above. A preferred solid-state microbiocidal composition of this type is formed by dewatering an aqueous biocide composition comprising water having in solution therein an active bromine content derived from (i) bromine chloride or bromine chloride and bromine, with or without conjoint use of chlorine, of at least 50,000 ppm (wt/wt) and preferably at least 100,000 ppm (wt/wt), and (ii) overbased alkali metal salt of sulfamic acid, wherein the relative proportions of (i) and (ii) are such that the atom ratio of nitrogen to active bromine is greater than 0.93, and wherein the pH of the composition is greater than 7, e.g., in the range of about 12 to 14. As noted above, concentrated solutions of this type are available in the marketplace, for example, Stabrom® 909 biocide (Albemarle Corporation). Removal of water can be accomplished by flashing or distillation at reduced pressure or preferably by spray drying. Such solid state products are typically in the form of powders or small particles, but can be compacted into larger forms preferably with the aid of one or more suitable binding agents. Further details concerning such processing are described in U.S. published Patent Application No. 2004/0022874 A1, all disclosure of which relating to formation of such solid-state compositions is incorporated herein by reference. In that application are disclosed, inter alia, the following composition and process:

A concentrated liquid biocide composition which comprises an aqueous solution of active bromine formed from (a) bromine, bromine chloride or a mixture of bromine chloride and bromine with (b) alkali metal salt of sulfamic acid and/or sulfamic acid, alkali metal base and water, or an aqueous solution of alkali metal salt of sulfamic acid formed from (1) alkali metal salt of sulfamic acid and/or sulfamic acid, (2) alkali metal base and (3) water, such aqueous solution of active bromine having a pH of at least about 7, and wherein the amounts of (a) and (b) are such that (i) the content of active bromine in the aqueous solution of active bromine is above about 160,000 ppm (wt/wt) (ii) the atom ratio of nitrogen to active bromine from (a) and (b) is greater than 1 when bromine is used without bromine chloride, and greater than 0.93 when bromine chloride is used with or without bromine.

A process of forming a solid state bromine-containing biocidal composition, which process comprises removing the water from an aqueous solution or slurry of a product formed in water from (A) (i) bromine, (ii) bromine chloride, (iii) a mixture of bromine chloride and bromine, (iv) bromine and chlorine in a $Br_2$ to $Cl_2$ molar ratio of at least about 1, or (v) bromine chloride, bromine, and chlorine in proportions such that the total $Br_2$ to $Cl_2$ molar ratio is at least about 1; and (B) (i) alkali metal salt of sulfamic acid and/or sulfamic acid, and (ii) alkali metal base, wherein such aqueous solution or slurry has a pH of at least 7 and an atom ratio of nitrogen to active bromine from (A) and (B) of greater than 0.93.

Concentrations of Bromine-Based Microbiocides Used

To form the aqueous microbiocidal composition applied to the fruit or vegetable in order to control bacterial, yeast, and/or mold contamination, thereon or therein, a microbiocidally effective amount of at least one particular component is selected from at least one of the Groups designated as Groups I), II), III), and IV) and is dissolved in water. The microbiocidally effective amount can vary depending upon various factors such as the identity of the particular component that is selected from Groups I), II), III), and IV), the amount and type of pathogen to be controlled, and the characteristics of the particular fruit or vegetable. However, pursuant to this invention, a microbiocidally effective amount of an antimicrobial composition of Groups I), II), III), and/or IV) is that which, upon addition to water, provides less than 100 ppm of active bromine, preferably in the range of 0.01 to 75 ppm (wt/wt) of active bromine, and more preferably, in the range of 0.01 to 50 ppm (wt/wt) in the resultant aqueous solution.

The aqueous microbiocidal composition applied to the fruit or vegetable is an aqueous microbiocidal composition that is formed from a microbiocidal component of I), II), III), and/or IV), and water, and that provides less than 100 ppm of active bromine.

Preparation Procedures

When using at least one solid state microbiocidal compound of Group I), (e.g., 1,3-dibromo-5,5-dimethylhydantoin or N,N'-bromochloro-5,5-dimethylhydantoin) or at least one solid-state microbiocidal composition of Group IV), e.g., a dewatered concentrated aqueous biocide composition formed by removing the water from Stabrom® 909 biocide (Albemarle Corporation), the amount of bromine is based on the weight of bromine in the solid-state microbiocidal compound or composition. When using a liquid component from among the particular components of Group II) or Group III), e.g., an aqueous solution or slurry of a solid-state microbiocidal compound having at least one bromine atom in the molecule of Group II), such as an aqueous solution of 1,3-dibromo-5,5-dimethylhydantoin or of N,N'-bromochloro-5,5-dimethylhydantoin, or a liquid Group III) concentrated aqueous microbiocidal composition such as Stabrom® 909 biocide (Albemarle Corporation) or Stabrex™ biocide (Nalco Chemical Company), the amount of bromine is based on the weight of active bromine in the liquid Group II) or Group III) composition. Consequently, the aqueous microbiocidal composition applied to the fruit or vegetable contains a microbiocidally-effective amount of at least one aqueous antimicrobial composition selected from the individual members of Groups I), II), III), and/or IV).

Preferably, the solid-state components used in forming the aqueous microbiocidal compositions that are applied to the fruit or vegetable are made from at least one particular component selected from at least one of Groups I), II), III), and IV). Preferably, the liquid-state components used in forming the aqueous microbiocidal compositions that are applied to the fruit or vegetable are formed from at least one of Groups I), II), III), and IV).

To form the aqueous microbiocidal composition which is applied to the fruit or vegetable, components at least one of Groups I), II), III), and IV) are added to or mixed with water. One way is to combine the component(s) of Groups I), II), III), and/or IV) with enough water to achieve the desired amount of active bromine. Alternatively, the component(s) of Groups I), II), III), and/or IV) can be made as preformed aqueous concentrated solutions or slurries of the component(s) which are then typically diluted in at least one step with sufficient water to form an aqueous microbiocidal composition which is applied to the fruit or vegetable. Other methods can be used when making up an aqueous microbiocidal composition. For example, both a preformed aqueous concentrated solution or slurry of component(s) of Groups I), II), III), and/or IV) and more water can be added to an initial quantity of water or liquid-state mixture of particular liquid-state component selected from Groups II) and/or III), or both a preformed aqueous concentrated solution or slurry of component(s) of Groups I), II), III), and/or IV) and a solid-state microbiocidal compound or composition from Groups I), II), III), and/or IV) can be added to the water.

Analytical Procedures

In order to measure the quantity of active bromine in water used in forming an aqueous microbiocidal composition of this invention, standard well known analytical procedures can be used. The term "active bromine" of course refers to all bromine-containing species that are capable of biocidal activity. It is generally accepted in the art that all of the bromine in the +1 oxidation state is biocidally active and is thus included in the term "active bromine". As is well known in the art, bromine, bromine chloride, hypobromous acid, hypobromite ion, hydrogen tribromide, tribromide ion, and organo-N-brominated compounds have bromine in the +1 oxidation state. Thus these, as well as other such species to the extent they are present, constitute the active bromine content of the compositions of this invention. See, for example, U.S. Pat. No. 4,382,799 and U.S. Pat. No. 5,679,239. A well-established method in the art for determining the amount of active bromine in a solution is starch-iodine titration, which determines all of the active bromine in a sample, regardless of what species may constitute the active bromine. The usefulness and accuracy of the classical starch-iodine method for quantitative determination of bromine and many other oxidizing agents has long been known, as witness Chapter XIV of Willard-Furman, *Elementary Quantitative Analysis*, Third Edition, D. Van Nostrand Company, Inc., New York, Copyright 1933, 1935, 1940.

A typical starch-iodine titration to determine active bromine is carried out as follows: A magnetic stirrer and 50 milliliters of glacial acetic acid are placed in an iodine flask. The sample (usually about 0.2-0.5 g) for which the active bromine is to be determined is weighed and added to the flask containing the acetic acid. Water (50 milliliters) and aqueous potassium iodide (15% (wt/wt); 25 milliliters) are then added to the flask. The flask is stoppered using a water seal. The solution is then stirred for fifteen minutes, after which the flask is unstoppered and the stopper and seal area are rinsed into the flask with water. An automatic buret (Metrohm Limited) is filled with 0.1 normal sodium thiosulfate. The solution in the iodine flask is titrated with the 0.1 normal sodium thiosulfate; when a faint yellow color is observed, one milliliter of a 1 wt % starch solution in water is added, changing the color of the solution in the flask from faint yellow to blue. Titration with sodium thiosulfate continues until the blue color disappears. The amount of active bromine is calculated using the weight of the sample and the volume of sodium thiosulfate solution titrated. Thus, the amount of active bromine in a composition of this invention, regardless of actual chemical form, can be determined by use of this method.

Another standard method for determining active bromine is commonly known as the DPD test procedure. This method is well suited for determining very small amounts of active bromine in aqueous systems. The standard DPD test for determination of low levels of active halogen is based on classical test procedures devised by Palin in 1974. See A. T. Palin, "Analytical Control of Water Disinfection With Special Reference to Differential DPD Methods For Chlorine, Chlorine Dioxide, Bromine, Iodine and Ozone", *J. Inst. Water Eng.*, 1974, 28, 139. While there are various modernized versions of the Palin procedures, the recommended version of the test is fully described in *Hach Water Analysis Handbook*, 3rd edition, copyright 1997. The procedure for "total chlorine" (i.e., active chlorine) is identified in that publication as Method 8167 appearing on page 379, Briefly, the "total chlorine" test involves introducing to the dilute water sample containing active halogen, a powder comprising DPD indicator powder, (i.e., N,N'-diethyldiphenylenediamine), KI, and a buffer. The active halogen species present react(s) with KI to yield iodine species which turn the DPD indicator to red/pink. The intensity of the coloration depends upon the concentration of "total chlorine" species (i.e., active chlorine") present in the sample. This intensity is measured by a colorimeter calibrated to transform the intensity reading into a "total chlorine" value in terms of mg/L $Cl_2$. If the active halogen present is active bromine, the result in terms of mg/L $Cl_2$ is multiplied by 2.25 to express the result in terms of mg/L $Br_2$ of active bromine.

In greater detail, the DPD test procedure is as follows:

1. To determine the amount of species present in the water which respond to the "total chlorine" test, the water sample should be analyzed within a few minutes of being taken, and preferably immediately upon being taken.
2. Hach Method 8167 for testing the amount of species present in the water sample which respond to the "total chlorine" test involves use of the Hach Model DR 2010 colorimeter. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the water under investigation. One of the cells is arbitrarily chosen to be the blank. To the second cell, the contents of a DPD Total Chlorine Powder Pillow are added. This is shaken for 10-20 seconds to mix, as the development of a pink-red color indicates the presence of species in the water which respond positively to the DPD "total chlorine" test reagent. On the keypad, the SHIFT TIMER keys are depressed to commence a three minute reaction time. After three minutes the instrument beeps to signal the reaction is complete. Using the 10 mL cell riser, the blank sample cell is admitted to the sample compartment of the Hach Model DR 2010, and the shield is closed to prevent stray light effects. Then the ZERO key is depressed. After a few seconds, the display registers 0.00 mg/L $Cl_2$. Then, the blank sample cell used to zero the instrument is removed from the cell compartment of the Hach Model DR 2010 and replaced with the test sample to which the DPD "total chlorine" test reagent was added. The light shield is then closed as was done for the blank, and the READ key is depressed. The result, in mg/L $Cl_2$ is shown on the display within a few seconds. This is the "total chlorine" level of the water sample under investigation. By multiplying this value by 2.25, the level of active bromine in the water sample is provided.

Applying Aqueous Solutions to Fruit or Vegetable

Various methods can be used for applying to fruit or vegetable an aqueous solution containing a microbiocidally-effective amount of a stabilized aqueous antimicrobial composition used pursuant to this invention. For example, the fruit or vegetable can be immersed in a tank containing such aqueous solution, or the fruit or vegetable can be subjected to one or more sprays or mists of such aqueous solution. Depending upon the size of the facility in which the fruit or vegetable is being treated, the spray or mist can be applied by use of hand-held sprays or misting devices. Alternatively, the sprays or mists can be applied from nozzles or misting devices disposed within spray or misting cabinets or zones into or through which the fruit or vegetable is conveyed as on a conveyor belt or other automated conveyor system. A microbiocidally-effective amount of stabilized aqueous antimicrobial composition can be applied to the unharvested fruit or vegetable before the fruit or vegetable is/are removed from the field or orchard. For this purpose, a spray of the composition can be applied to the vegetables while in the field and the fruit while on the trees. In the case of fruit trees, the upper portion of the tree can be enveloped in a plastic film under which a fine spray, mist, or fog of the composition can be applied to the upper portion of the tree including the fruit.

As noted above, after application of the aqueous microbiocidal solution to the fruit or vegetable, the fruit or vegetable is then washed with water in order to thoroughly wash away the microbiocidal composition from the fruit or vegetable. The time period between the application of the aqueous microbiocidal solution and the commencement of the water washing can vary, depending upon such factors as the identity of the microbiocide used in forming the aqueous microbiocidal solution, the concentration of the aqueous microbiocide in the aqueous microbiocidal solution used, and the nature and content of microbes, bacteria, fungus, yeast, mold, or other pathogens present or likely to be present on the fruit or vegetable. Generally speaking, however, the aqueous microbiocidal solution should remain in contact with the fruit or vegetable for a period in the range of about 10 seconds to about 30 minutes, and preferably in the range of about 30 seconds to about 5 minutes. Promptly thereafter the thorough water washing should be initiated. If desired, a suitable non-toxic surface active agent (surfactant, detergent, etc.) can be used in the washing operations to enhance the cleansing activity of the water wash. After using a surface active agent in water as a washing medium, the fruit or vegetable should be thoroughly washed with pure water.

Edible Fruits or Vegetables

As pointed out at the outset, "edible fruit or vegetable" denotes any harvested or unharvested edible uncooked fruit or vegetable that is grown for consumption by humans. Thus, the methods of this invention are applicable to a wide variety of edible fruits and vegetables. Some non-limiting examples of edible fruits include plums, apricots, peaches, apples, oranges, lemons, limes, tangerines, grapefruit, bananas, pears, cherries, grapes, tomatoes, strawberries, cranberries, blueberries, blackberries, raspberries, gooseberries, figs, pineapple, watermelon, pumpkin, cantaloupe, mango, papaya, peanuts, walnuts, pecans, almonds, cashew nuts, prunes, raisins, dried figs, dried apricots, dried pineapple, dried cranberries, dried apples, and dried bananas, among others. Some non-limiting examples of edible vegetables include potatoes, onions, green onions, shallots, garlic, carrots, turnips, beets, parsnips, radishes, rutabaga, celery, mushrooms, corn, okra, spinach, cabbage, kale, lettuce, broccoli, cauliflower, string beans, peas, cucumbers, squash, zucchini, among others. This invention is deemed especially effective for use in microbiocidal treatment of leafy vegetables such as, for example, white cabbage, red cabbage, kale, iceberg lettuce, romaine lettuce, spinach, mustard greens, collard greens, watercress, dandelion, and leafy vegetables used as seasonings such as bay leaves, mint, thyme, basil, and oregano.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. Method of controlling bacterial, yeast, and/or mold contamination of at least one fruit or vegetable, which method comprises applying to the fruit or vegetable an aqueous microbiocidal composition, said composition containing less than 100 ppm (wt/wt) of active bromine and having been formed from components comprising water and at least one microbiocidal component that is selected from:
   III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7; and
   IV) a solid-state microbiocidal composition which is a dewatered concentrated aqueous antimicrobial composition of III).

2. A method as in claim 1 wherein said component is a concentrated aqueous microbiocidal composition of III).

3. A method as in claim 1 wherein said component is a solid-state microbiocidal composition of IV).

4. A method as in claim 2 wherein the pH is in the range of 12 to 14.

5. A method as in claim 2 wherein the overbased alkali metal salt of sulfamic acid and/or sulfamic acid is a lithium, sodium, and/or potassium salt of sulfamic acid.

6. A method as in claim 1 wherein said composition contains in the range of 0.01 to 75 ppm (wt/wt) of active bromine.

7. A method as in claim 1 wherein the aqueous microbiocidal composition is allowed to remain in contact with the edible fruit or vegetable for a time in the range of 10 seconds to 30 minutes.

8. A method as in claim 1 wherein the aqueous microbiocidal composition has been formed from components comprising water and at least one microbiocidal component that is selected from:
   III) a concentrated aqueous microbiocidal composition having an active bromine content of at least 50,000 ppm, which composition is formed from components consisting of water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7; and
   IV) a solid-state microbiocidal composition which is a dewatered concentrated aqueous antimicrobial composition of III).

* * * * *